H. KELLOGG.

Metal Rolling Machine.

No. 9,385. Reissued Sept. 21, 1880.

WITNESSES:

Livingston Gifford

W. A. Hutchinson

INVENTOR:

Henry Kellogg

BY Gifford & Gifford

ATTORNEYS.

UNITED STATES PATENT OFFICE.

HENRY KELLOGG, OF NEW HAVEN, CONNECTICUT

METAL-ROLLING MACHINE.

SPECIFICATION forming part of Reissued Letters Patent No. 9,385, dated September 21, 1880.

Original No. 133,453, dated November 26, 1872. Application for reissue filed June 2, 1880.

*To all whom it may concern:*

Be it known that I, HENRY KELLOGG, of New Haven, in the county of New Haven and State of Connecticut, have invented a new and useful Improvement in Rolling Shafting, Rods, or Bars; and I do hereby declare that the following is a full, clear, and exact description of the same, reference being had to the accompanying drawings, forming part of this specification.

My invention relates to improvements in rolling metallic shafting, rods, or bars by the use of that class of rolling-machines in which the shafting, rods, or bars are passed between the rolls in a longitudinal or axial direction.

Figure 1:
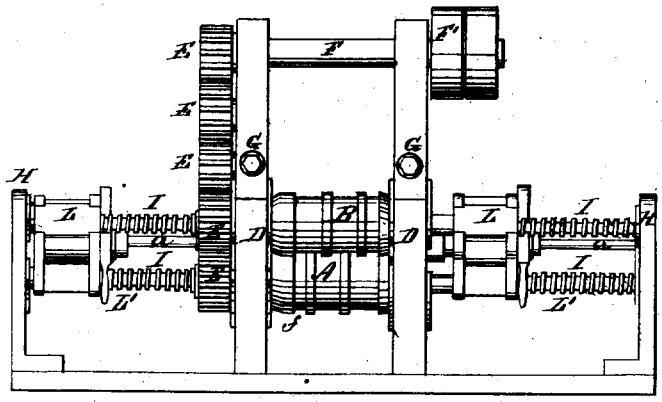
Figure 2:
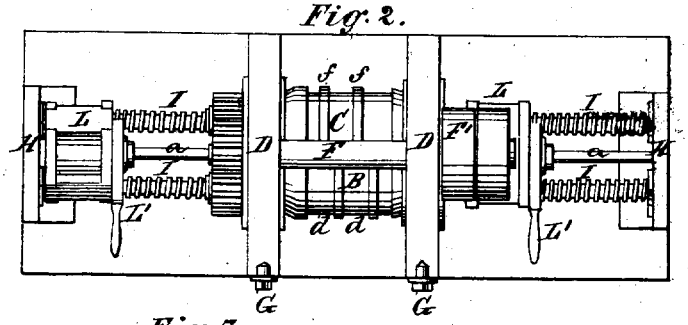

In the drawings, Figure 1 represents a side view of the machine I employ; Fig. 2, a top view of the same, and Figs. 3 and 4 transverse sections of the same.

The rolls A, B, and C are each constructed with alternate grooves and projections, and are arranged so as to receive the shafting, rods, or bars to be rolled in a line substantially parallel with their axes.

Figure 4:
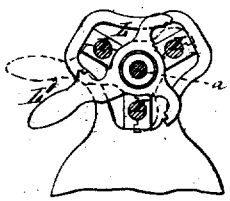

The several rolls, preferably each having its projections arranged with reference to the projections on the other rolls, as shown in the drawings, are coupled together by a chain of gears, E, and to the driving-shaft F, on which are arranged pulleys F′, through which power is communicated to cause the rolls to revolve. The ends of the rolls are slightly chamfered, as shown in Figs. 1 and 2, and are made adjustable by set-screws G, so as to be set in the relation to each other required for the diameter of the shafting when finished. The shafts upon which the rolls are respectively arranged extend through and to other bearings H, to support the extended shafts. These shafts are threaded to form screws I, and on the screws at each end are arranged head-blocks L, which are bored out so as to slide freely over the screws. On each head-block is arranged a lever, L′, fitted, as seen in Fig. 4, to engage with all the screws, as denoted in broken lines in Fig. 4. When thus engaged the head-blocks will be moved by the screws; disengaged, the screws have no effect on the head-blocks.

Figure 3:
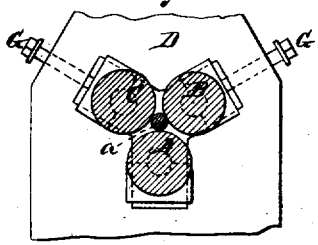

I prefer that the feeding apparatus be so arranged that every projection on each roll will act on every part of the surface of the shafting, rod, or bar being rolled, and it is plain that this is possible and may be accomplished in my machine by having the pitch of the feeding-screws I so proportioned to the width of the projections on the rolls and the diameters of the rolls and the rod or bar being rolled that every time the rod revolves between the rolls it will have advanced a certain definite distance—say not more than the width of a projection on the rolls. The shaft to be rolled is passed through one of the head-blocks to the rolls, the head-block being thrown out from the rolls. Then power is applied to cause the rolls and screws to revolve and the said head-block engaged with the feeding-screws. The shaft will be fed into the rolls, passing longitudinally between them, (*a*, Fig. 3, representing the shaft,) and thus continue until the head-block is run up to the rolls, or its full extent. Then the head-block is disengaged and moved back to take a second hold on the shaft.

It will be understood that the shaft is secured in the head-block so as to be forced forward as the head-block moves, then feeding again until the shaft extends through so as to enter the head-block on the opposite side. Then the two head-blocks (should the shaft be of sufficient length) are applied and aid in feeding and properly guiding the shaft.

The result of the above-described operation on the shafting, rod, or bar is that it passes from the machine straight and round and with an exact and even diameter and the most perfectly-finished surface. That result is facilitated by the arrangement of the rolls shown in the drawings—that is to say, on two of the rolls are formed annular grooves *d*, and on another roll corresponding projections *f*, the projections *f* being slightly narrower than the grooves *d*, and being opposite the grooves *d*.

What I claim is—

1. In a mechanism for rolling shafting, rods, or bars, consisting of the arrangement of rolls to act longitudinally or axially on the shafting, rods, or bars, the threaded shafts I, head-blocks L, and lever L′, for connecting or disconnecting the said head-blocks with or from the said shafts, substantially as described.

2. In a mechanism for rolling shafting, rods, or bars, consisting in the arrangement of rolls to act longitudinally or axially upon the said shafting, rods, or bars, the said rolls constructed with annular grooves and projections, substantially as shown and described.

3. In a mechanism for rolling shafting, rods, or bars containing rolls to act longitudinally or axially upon said shafting, rods, or bars, the said rolls constructed with annular grooves and projections, in combination with a feeding mechanism, substantially as shown and described.

4. The process of finishing shafting, rods, or bars by passing them longitudinally or axially between rolls formed with grooves and projections, substantially as described.

5. In a machine for rolling shafting, rods, or bars by passing the same between annular-grooved rolls longitudinally or axially, the arrangement of the projections on the rolls with reference to each other, substantially as shown in the drawings.

6. In a machine for rolling shafting, rods, or bars, a roll constructed with alternate grooves and projections, in combination with other rolls and a feeding mechanism, and so arranged that the shaft, rod, or bar is passed between the rolls substantially parallel with the axis thereof.

7. In a machine for rolling shafting, rods, or bars, rolls constructed with alternate grooves and projections or collars and a feeding mechanism, the diameter of the rolls, the breadth of the projections or collars, the pitch of the feeding mechanism, and the diameter of the shaft, rod, or bar being rolled all being proportioned substantially as shown.

Witnesses: HENRY KELLOGG.
LIVINGSTON GIFFORD,
WILLIAM C. TIBBY, Jr.